US009697660B1

(12) United States Patent
Sokolov et al.

(10) Patent No.: US 9,697,660 B1
(45) Date of Patent: Jul. 4, 2017

(54) SYSTEMS AND METHODS FOR VERIFYING USER ATTRIBUTES

(71) Applicant: Symantec Corporation, Mountain View, CA (US)

(72) Inventors: Ilya Sokolov, Boston, MA (US); Kevin Jiang, Lafayette, CA (US); Bruce McCorkendale, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/985,675

(22) Filed: Dec. 31, 2015

(51) Int. Cl.
*G05B 19/00* (2006.01)
*G07C 9/00* (2006.01)

(52) U.S. Cl.
CPC ................................ *G07C 9/00158* (2013.01)

(58) Field of Classification Search
CPC .................................................. G07C 9/00158
USPC ... 340/5.52, 5.51, 5.53, 5.4, 5.6, 438, 426.1; 705/5, 2, 40, 7.29, 26.63, 39; 701/408, 2, 701/45
See application file for complete search history.

(56) References Cited

U.S. PATENT DOCUMENTS 9,202,173 B1* 12/2015 Dotan ...................... G06N 5/02
9,218,468 B1* 12/2015 Rappaport .............. G06F 21/30
2006/0082439 A1* 4/2006 Bazakos ............ G06K 9/00228 340/5.82
2012/0079576 A1 3/2012 Han et al.
2013/0290201 A1* 10/2013 Rodriguez Carrillo .................. G06Q 50/30 705/318
2013/0318580 A1 11/2013 Gudlavenkatasiva et al.
2016/0082926 A1* 3/2016 Mouser ................. B60R 25/252 701/2

OTHER PUBLICATIONS

Evgenios Kornaropoulos, et al; Systems and Methods for Securely Detecting Data Similarities; U.S. Appl. No. 14/871,868, filed Sep. 30, 2015.
Symantec VIP Intelligent Authentication, http://www.symantec.com/content/en/us/enterprise/fact_sheets/b-vip_intelligent_authentication_DS_21213685.en-us.pdf, as accessed Jan. 13, 2016, Data Sheet: Authentication, Symantec Corporation, (Oct. 2011).
Snapshot; https://www.progressive.com/auto/snapshot/, as accessed Nov. 18, 2015; Progressive Casualty Insurance Company; On or before Nov. 18, 2015.
(Continued)

*Primary Examiner* — Dhaval Patel
(74) *Attorney, Agent, or Firm* — FisherBroyles LLP

(57) ABSTRACT

The disclosed computer-implemented method for verifying user attributes may include (1) receiving a request to verify an attribute of a user who claims to be a particular person, (2) determining that the attribute can be verified using a trusted record that is associated with the particular person, (3) determining that the trusted record is associated with a vehicle to which the particular person has access rights, (4) confirming that the user has physical access to the vehicle by performing an access-validation check, and (5) in response to confirming that the user has physical access to the vehicle, using the trusted record to verify the attribute of the user. Various other methods, systems, and computer-readable media are also disclosed.

20 Claims, 7 Drawing Sheets

(56) References Cited

OTHER PUBLICATIONS

FasTrak; https://www.bayareafastrak.org/en/howitworks/gettingstarted.shtml, as accessed Nov. 18, 2015; On or before Nov. 18, 2015.
E-ZPass, https://www.e-zpassny.com/en/home/index.shtml, as accessed Nov. 18, 2015, (On or before Nov. 18, 2015).
Fastpass, https://disneyland.disney.go.com/guest-services/fastpass/, as accessed Nov. 18, 2015, Disney, (On or before Nov. 18, 2015).
Toll Payment Options at the Golden Gate Bridge, http://www.goldengate.org/tolls/tollpaymentoptions.php, as accessed Nov. 18, 2015, (On or before Nov. 18, 2015).
OnStar, https://www.onstar.com/us/en/home.html, as accessed Nov. 18, 2015, (On or before Nov. 18, 2015).
BMW Assist, http://www.bmwusa.com/Standard/Content/Explore/BMWValue/BMWAssist/default.aspx, as accessed Nov. 18, 2015, (On or before Nov. 18, 2015).
Department of Motor Vehicles, https://www.dmv.ca.gov/portal/dmv, as accessed Nov. 18, 2015, (On or before Nov. 18, 2015).
Kevin Jiang, et al; Systems and Methods for Using Vehicles as Information Sources for Knowledge-Based Authentication; U.S. Appl. No. 14/979,620, filed Dec. 28, 2015.
Bruce McCorkendale; Systems and Methods for Authenticating Users; U.S. Appl. No. 14/834,949, filed Aug. 25, 2015.
Ilya Sokolov, et al; Systems and Methods for Evaluating Identity Intensity; U.S. Appl. No. 15/057,618, filed Mar. 1, 2016.
Home—Good Security Questions; http://goodsecurityquestions.com/, as accessed Jun. 25, 2015, (Dec. 27, 2007).

* cited by examiner

SYSTEMS AND METHODS FOR VERIFYING USER ATTRIBUTES

BACKGROUND

As service providers increasingly provide services and information through online services, they may seek methods by which to verify various attributes of a user, such as home address, employment status, social security number, or any other relevant information about an individual. Traditional methods to verify certain user attributes have been available for some time, such as confirming a user's mailing address by sending a confirmation code by postal mail. Service providers may also require individuals to provide some form of proof of identity, such as a copy of a birth certificate, driver's license, or other government-issued identification. Additionally or alternatively, a service provider may send a verification code to a phone number that is known to be tied to a particular physical address.

Unfortunately, traditional verification methods suffer from a number of flaws. For example, a mailed verification code can take several days to reach a user, and even longer for international users. Furthermore, fewer and fewer individuals maintain landline telephones in favor of mobile devices. Additionally, as businesses increasingly provide services through online media, it may be extremely difficult, time-consuming, and/or expensive to obtain traditional proofs of identity. Even if an individual is able to provide a form of proof of identity, an organization may have no easy way to quickly verify the validity of the document. Accordingly, the instant disclosure identifies and addresses a need for improved systems and methods for verifying user attributes.

SUMMARY

As will be described in greater detail below, the instant disclosure describes various systems and methods for verifying user attributes by proving that a user has direct physical access to a vehicle and therefore is likely to own that vehicle. Once systems and methods described herein have confirmed that the user has access to the vehicle, systems and methods described herein may verify an attribute of the user by retrieving and extracting information from vehicle ownership records associated with the vehicle.

In one example, a computer-implemented method for verifying user attributes may include (1) receiving a request to verify an attribute of a user who claims to be a particular person, (2) determining that the attribute can be verified using a trusted record that is associated with the particular person, (3) determining that the trusted record is associated with a vehicle to which the particular person has access rights, (4) confirming that the user has physical access to the vehicle by performing an access-validation check, and (5) in response to confirming that the user has physical access to the vehicle, using the trusted record to verify the attribute of the user. In some embodiments, the attribute of the user may include (1) the user's physical address, (2) the user's age, (3) the user's date of birth, (4) the user's social security number, (5) a financial security rating associated with the user, (6) the user's driving record, and/or (7) the user's employment status. Moreover, the access rights may include (1) the vehicle being a company vehicle that is assigned to be driven by the user, (2) the user's name appearing on a vehicle registration that is linked to the vehicle, and/or (3) the user's name appearing on an automotive insurance policy that is linked to the vehicle.

In some embodiments, verifying the attribute of the user may include accessing a vehicle ownership record about the vehicle that is managed by a government-operated database of motor vehicles. The trusted record may include the vehicle ownership record. In some examples, using the trusted record to verify the attribute of the user may include comparing information within the vehicle ownership record to personal information provided by the user.

Performing the access-validation check may include a variety of steps. In one embodiment, performing the access-validation check includes asking the user a knowledge-based authentication question where the correct response to the knowledge-based authentication requires information that is only obtainable through direct access to the vehicle. Additionally or alternatively, performing the access-validation check may include instructing the user to drive the vehicle to a verification checkpoint location. The verification checkpoint location may perform a variety of tasks, including but not limited to (1) scanning the license plate of the vehicle, (2) capturing a photograph of the user and comparing the photograph to a previously captured image of the user, and/or (3) capturing transponder information from a transponder attached to the vehicle.

In some examples, performing the access-validation check may include transmitting an authorization code to the vehicle. In such examples, the user may obtain the authorization code from the vehicle and use the authorization code to respond to the access-validation check. In some examples, transmitting the authorization code to the vehicle may include providing the authorization code to an onboard network that is part of the vehicle and transmitting, via the onboard network, the authorization code to a mobile device paired to the onboard network.

In one embodiment, a system for implementing the above-described method may include (1) a receiving module, stored in memory, that receives a request to verify an attribute of a user who claims to be a particular person, (2) a determination module, stored in memory, that (a) determines that the attribute can be verified using a trusted record that is associated with the particular person and (b) determines that the trusted record is associated with a vehicle to which the particular person has access rights, (3) a confirmation module, stored in memory, that confirms that the user has physical access to the vehicle by performing an access-validation check, (4) a verification module, stored in memory, that uses the trusted record to verify the attribute of the user, and (5) at least one physical processor configured to execute the receiving module, the determination module, the confirmation module, and the verification module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) receive a request to verify an attribute of a user who claims to be a particular person, (2) determine that the attribute can be verified using a trusted record that is associated with the particular person, (3) determine that the trusted record is associated with a vehicle to which the particular person has access rights, (4) confirm that the user has physical access to the vehicle by performing an access-validation check, and (5) in response to confirming that the user has physical access to the vehicle, use the trusted record to verify the attribute of the user.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
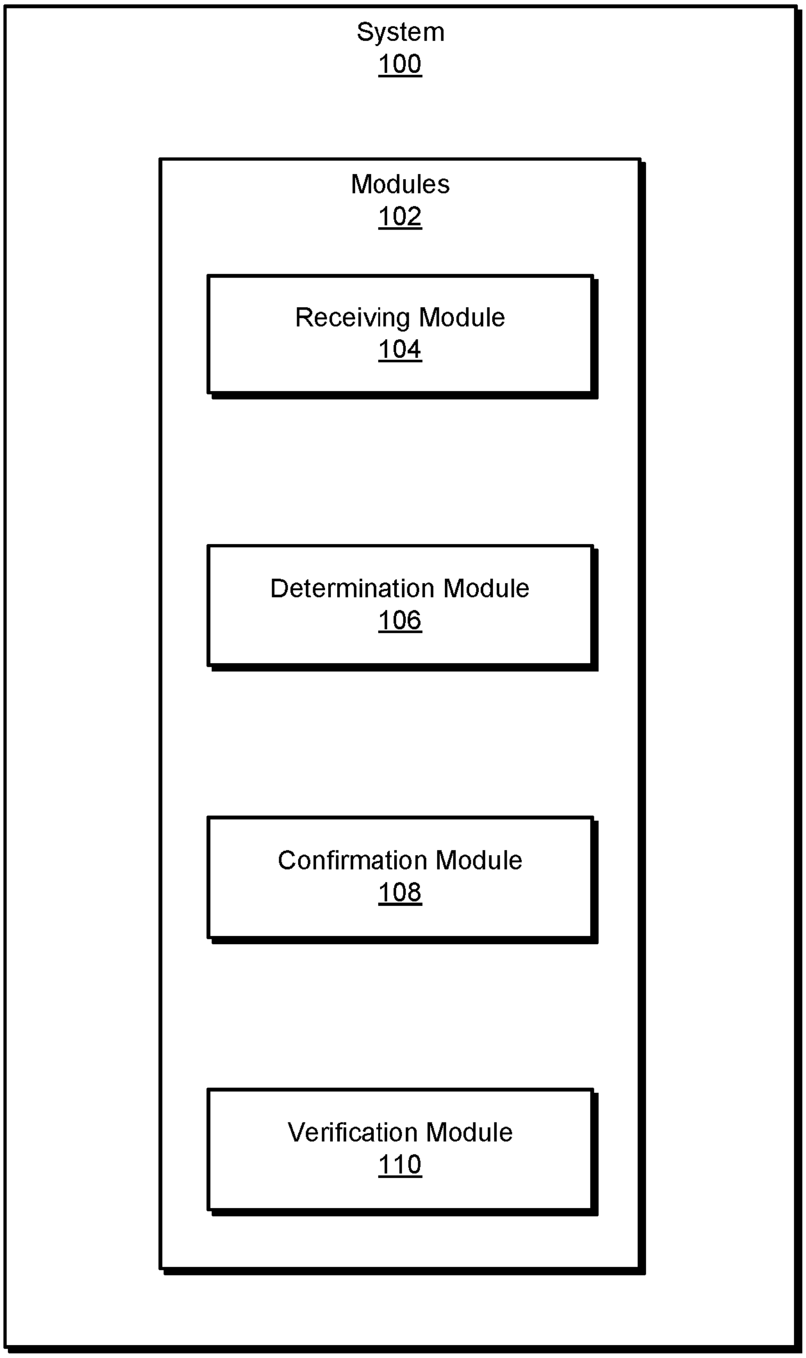
FIG. 1 is a block diagram of an exemplary system for verifying user attributes.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for verifying user attributes. As will be explained in greater detail below, systems and methods described herein may perform any or all of a variety of access-confirmation checks in order to establish an association between a user and a vehicle, and by extension, between the user and information related to that vehicle. This information can then be used to verify various user attributes.

Figure 2:
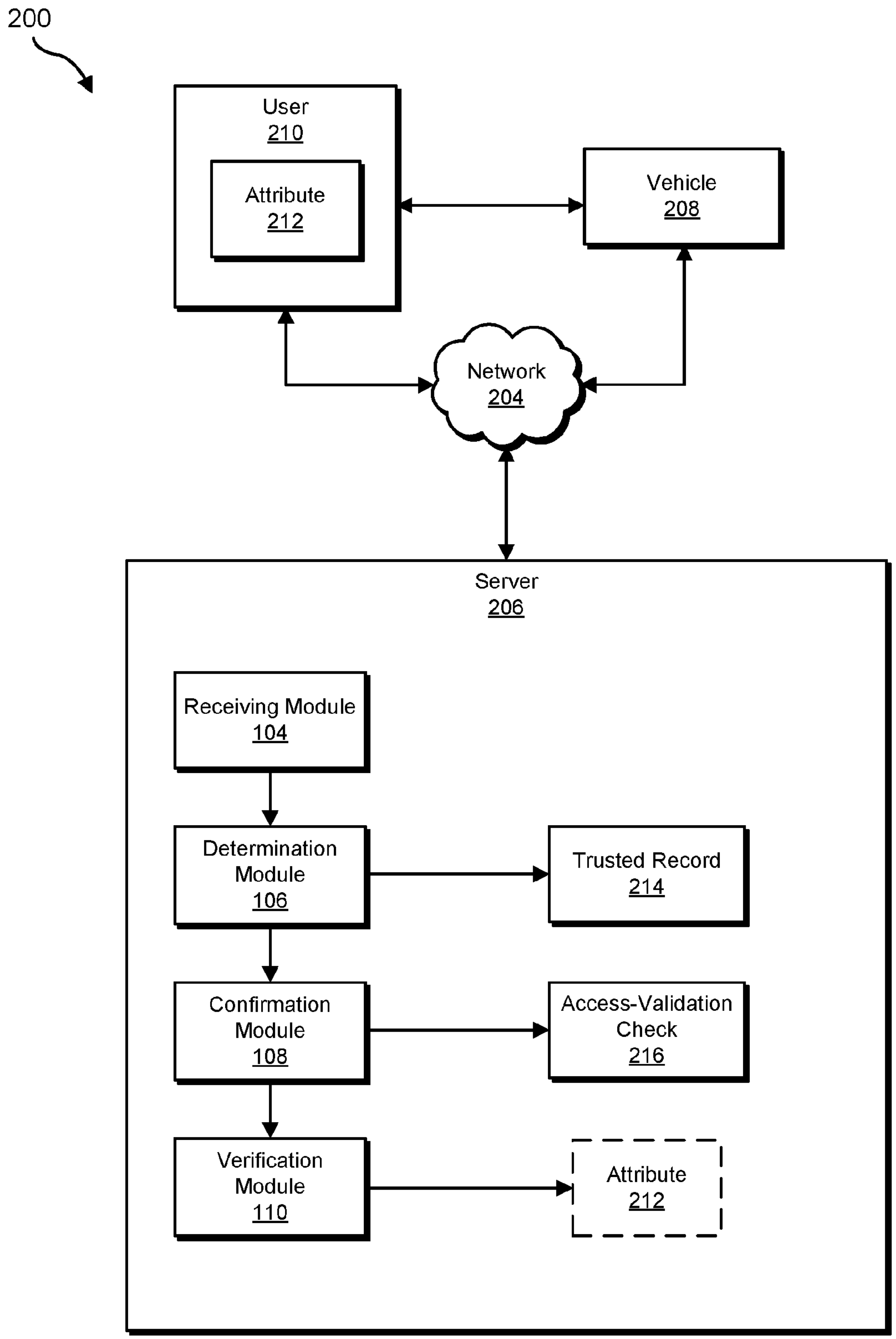
FIG. 2 is a block diagram of an additional exemplary system for verifying user attributes.

The following will provide, with reference to FIGS. 1-2, detailed descriptions of exemplary systems for verifying user attributes. Detailed descriptions of corresponding computer-implemented methods will also be provided in connection with FIG. 3. Detailed descriptions of an exemplary system for selecting a vehicle by which to verify user attributes are provided in connection with FIG. 4. Detailed descriptions of an exemplary verification checkpoint by which to confirm that a user has physical access to a vehicle are provided in connection with FIG. 5. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for verifying user attributes. As illustrated in this figure, exemplary system 100 may include one or more modules 102 for performing one or more tasks. For example, and as will be explained in greater detail below, exemplary system 100 may include a receiving module 104 that receives a request to verify an attribute of a user who claims to be a particular person. Exemplary system 100 may additionally include a determination module 106 that determines that the attribute can be verified using a trusted record that is associated with the particular person. Determination module 106 may additionally or alternatively determine that the trusted record is associated with a vehicle to which the particular person has access rights. Exemplary system 100 may also include a confirmation module 108 that confirms that the user has physical access to the vehicle by performing an access-validation check. Furthermore, exemplary system 100 may include a verification module 110 that, in response to confirmation module 108 confirming that the user has physical access to the vehicle, uses the trusted record to verify the attribute of the user. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a user 210 and a vehicle 208 in communication with a server 206 via a network 204. For example, server 206 may be programmed with one or more of modules 102. User 210 may communicate with server 206 via a computing device (not illustrated), such as a personal computer, smart phone, or other network-enabled device.

In one embodiment, one or more of modules 102 from FIG. 1 may, when executed by at least one processor of server 206, enable server 206 to confirm that a user has physical access to a vehicle, and thereby allow server 206 to use a trusted record associated with the vehicle to verify an attribute of the user. For example, and as will be described in greater detail below, receiving module 104 may receive a request to verify an attribute 212 of a user 210 who claims to be a particular person. Determination module 106 may determine that attribute 212 can be verified using a trusted record 214 that is associated with the particular person. Determination module 106 may additionally determine that trusted record 214 is associated with a vehicle 208 to which the particular person has access rights. Confirmation module 108 may confirm that user 210 has physical access to vehicle 208 by performing an access-validation check 216. Verification module 110 may, in response to confirmation module 108 confirming that user 210 has physical access to vehicle 208, verify attribute 212 of user 210 by using trusted record 214.

Server 206 generally represents any type or form of computing device that is capable of communicating with a vehicle via a network. Additionally or alternatively, server 206 may be capable of issuing an access-validation check and verifying that a user has responded correctly to the access-validation check. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between vehicle 208 and server 206.

Attribute 212 generally represents any information, characteristic, and/or condition of a user. For example, the attribute of the user may include, without limitation, the user's physical address, the user's age, the user's date of birth, the user's social security number, a financial security rating associated with the user, the user's driving record, and/or the user's employment status. Some attributes, such as a social security number, may uniquely identify the user.

Trusted record 214 generally represents a list or collection of attributes, including those described in connection with attribute 212, that are associated with a given person. Trusted records are generally maintained by an entity that verifies a person's identity before creating a trusted record in their name. Examples of entities that might maintain trusted records include government organizations, such as a DEPARTMENT OF MOTOR VEHICLES (DMV), which is responsible for maintaining government information regarding vehicle ownership.

Figure 3:
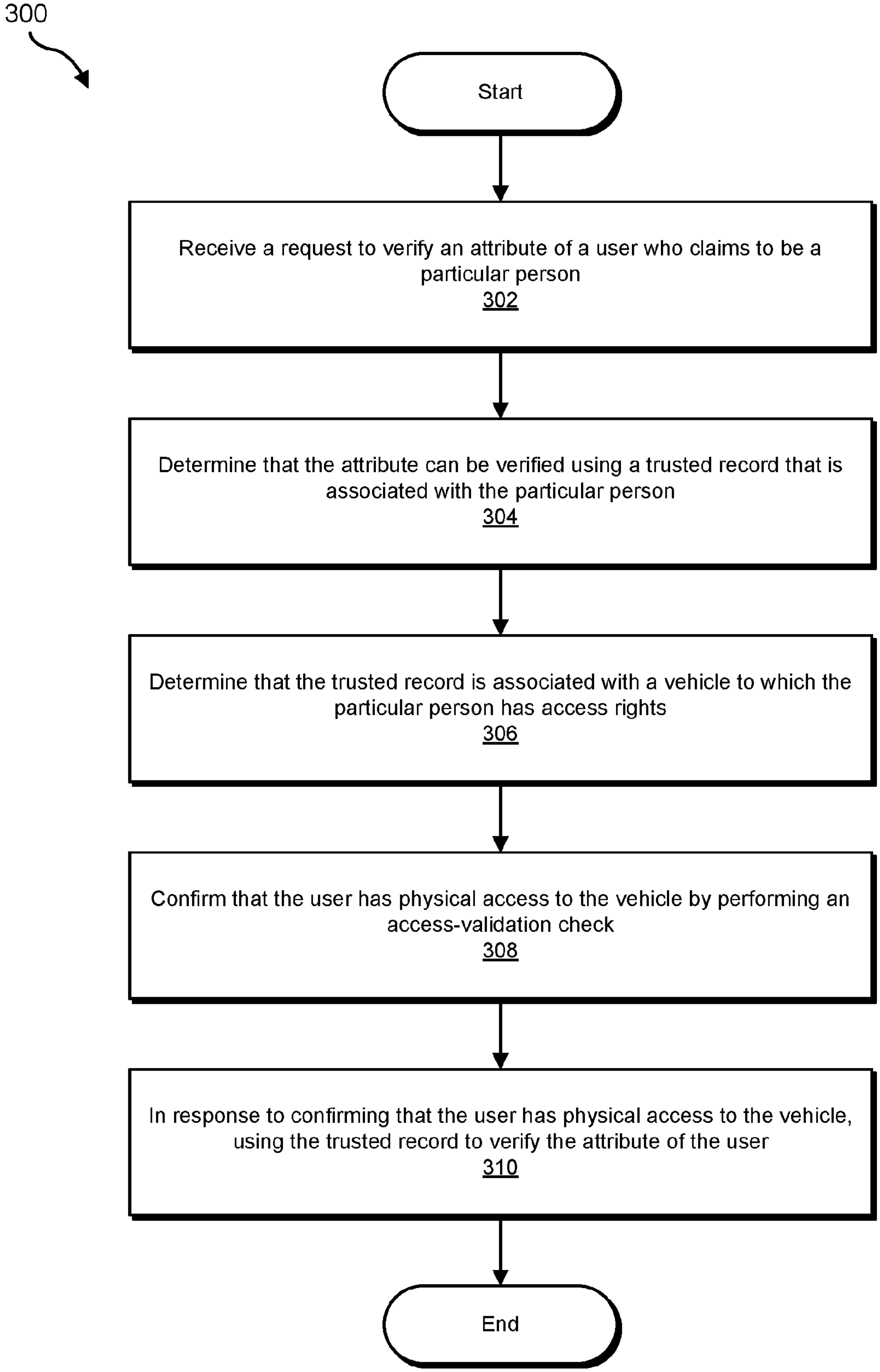
FIG. 3 is a flow diagram of an exemplary method for verifying user attributes.

FIG. 3 is a flow diagram of an exemplary computer-implemented method 300 for verifying user attributes. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may receive a request to verify an attribute of a user who claims to be a particular person. For example, receiving module 104 may, as part of server 206 in FIG. 2, receive a request to verify attribute 212 of user 210 who claims to be a particular person.

Receiving module 104 may receive the verification request in a variety of contexts. For example, a user may wish to verify their identity to a protected service, such as a banking institution's website or an online government benefits system, in order to gain access to the protected service. As a specific example, a user may wish to access a social security service. However, the user must first prove that they are the individual associated with a particular social security number before they are allowed to access the service. The user and/or the social security service may thus submit a request to receiving module 104 to verify the user's social security number.

As an additional specific example, a user may wish to list their vehicle for sale on an online marketplace. However, the marketplace may wish to confirm that the user does in fact own the vehicle and is not attempting to commit a fraudulent sale. Accordingly, the marketplace may submit a request to receiving module 104 to verify that the user does in fact own the vehicle that they claim to own. As a further specific example, a government benefits service may submit a request to verify the user's employment status. In the event that the user's vehicle is provided by their employer, the fact that the user has direct physical access to the vehicle may serve as an indicator that the user is employed by that employer.

At step 304 in FIG. 3, one or more of the systems described herein may determine that the attribute can be verified using a trusted record that is associated with the particular person. For example, determination module 106 may, as part of server 206 in FIG. 2, determine that attribute 212 can be verified using trusted record 214 that is associated with the particular person.

Determination module 106 may determine that the attribute can be verified using a trusted record in a variety of ways. In general, determination module 106 may attempt to locate a trusted record for the particular person that user 210 is claiming to be and may search that trusted record for an attribute entry that can be used to verify attribute 212. In some embodiments, determination module 106 may maintain a list of databases that contain trusted records and may associate each database's entry in the list with information that describes the user attributes collected by that database. For example, determination module 106 may maintain a list that includes a DEPARTMENT OF MOTOR VEHICLES as an entry in the list. The list may indicate that the DEPARTMENT OF MOTOR VEHICLES maintains a database that collects users' eye color, height, driving record, etc.

Additionally or alternatively, determination module 106 may be able to directly search a collection of trusted records. For example, systems and methods described herein may maintain their own collection of trusted records retrieved and/or aggregated from other sources. Additionally or alternatively, systems and methods described herein may have access to other databases of trusted records. For example, systems and methods described herein may collect and/or access trusted records from a social security service, a law-enforcement service, a vehicle dealership, and/or a DEPARTMENT OF MOTOR VEHICLES. Determination module 106 may search the trusted records that it can access in order to find a trusted record for the person that the user is claiming to be. A specific example of this search process will be provided in greater detail below in connection with FIG. 4.

At step 306 in FIG. 3, one or more of the systems described herein may determine that the trusted record is associated with a vehicle to which the particular person has access rights. For example, determination module 106 may, as part of server 206 in FIG. 2, determine that trusted record 214 is associated with vehicle 208 to which the particular person has access rights.

The access rights may take a variety of forms. In general, a trusted record may contain information that indicates that the particular person has access rights to the vehicle. For example, user 210 may be employed by a company that provides a company-sponsored vehicle to user 210. In this example, the access rights may comprise the vehicle being assigned to be driven by user 210. The trusted document may, in this example, be a vehicle assignation form that contains the user's name, employee ID, and driver's license number, and the vehicle's vehicle identification number (VIN) and license plate number.

As an additional example, the user's name may appear on a vehicle registration, such as those maintained by government vehicle-ownership databases, that is associated with the vehicle, thus indicating that the user owns and has access rights to the vehicle. This registration entry may be used as a trusted document and contain information that uniquely identifies the user, such as their driver's license number. As a further example, the user's name may appear on an insurance policy associated with the vehicle, thus indicating that the user is likely to drive the vehicle and therefore have access rights to the vehicle. Once again, the insurance policy forms may be used as trusted documents that also can be used to verify attributes about the user.

Determination module 106 may determine that the trusted record is associated with a vehicle to which the particular person has access rights in a variety of ways. For example, determination module 106 may scan the trusted document for information that uniquely identifies a motor vehicle, such as a license plate number or VIN. Additionally or alternatively, determination module 106 may prompt the user to provide information that uniquely identifies a vehicle to which they claim to have access rights.

In further examples, determination module 106 may receive information that uniquely identifies the user, search vehicle ownership records for records that match the user's information, and use the matching vehicle ownership records to identify the user's vehicle. Specifically, determination module 106 may receive personally identifying information from user 210, search a database of vehicle records for records that match user 210's personal information, and then use a vehicle identified in the matching vehicle records as vehicle 208.

In the event that determination module 106 identifies more than one eligible vehicle for use as vehicle 208, determination module 106 may use a variety of methods to select a specific vehicle for use as vehicle 208. For example, determination module 106 may randomly select a discovered vehicle for use as vehicle 208. Alternatively, determination module 106 may prompt user 210 to select a discovered vehicle for use as vehicle 208. As a specific example, determination module 106 may identify that user 210 has access rights to two vehicles, a HONDA CIVIC and an AUDI A5. Determination module 106 may thus ask user 210 whether they would prefer to use the HONDA CIVIC or the AUDI A5 for purposes of verifying attribute 212.

Figure 4:
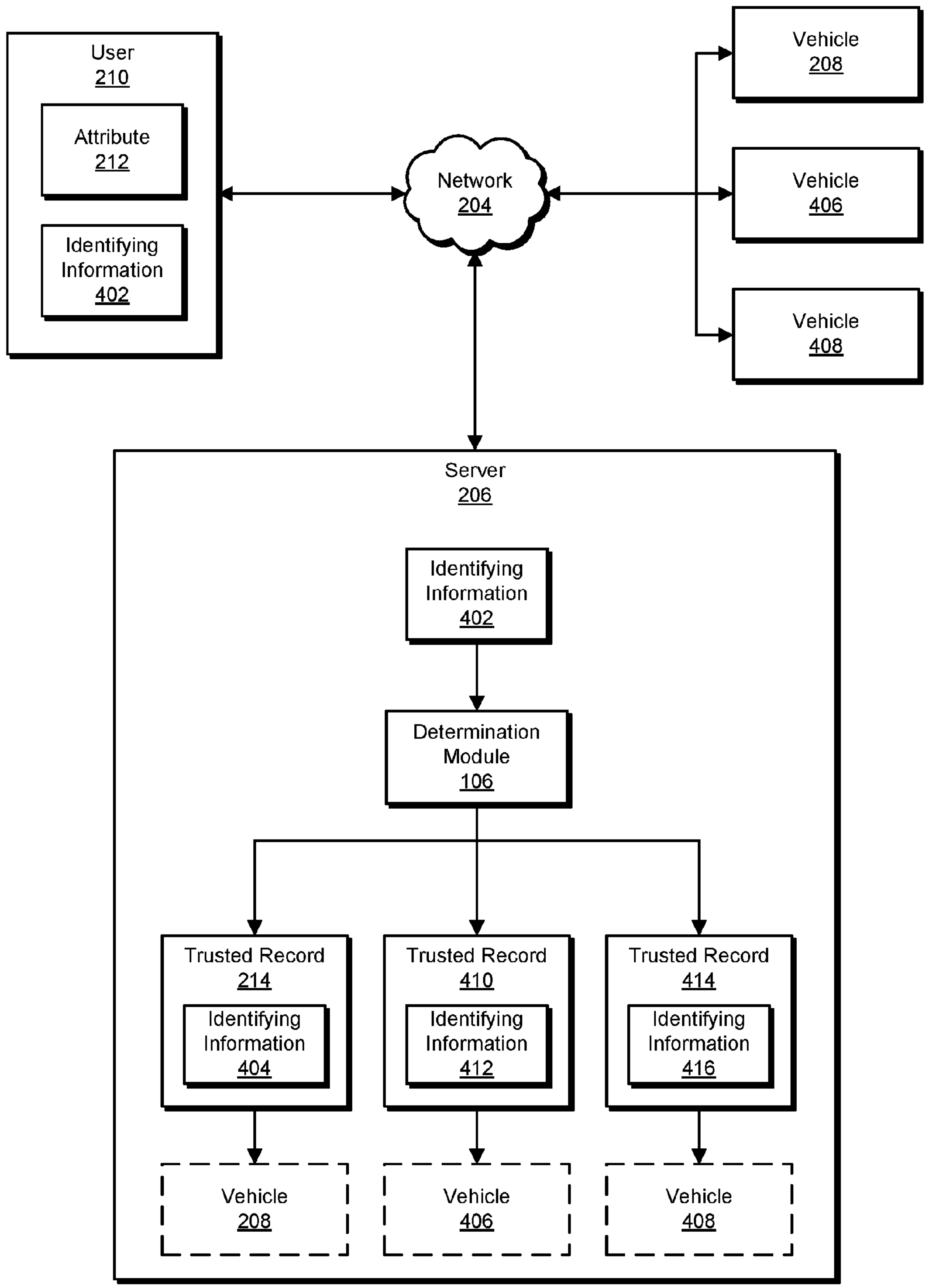
FIG. 4 is a block diagram of an exemplary computing system for selecting a vehicle by which to verify user attributes.

An illustrated example of the vehicle selection process is shown in FIG. 4. Receiving module 104 (not illustrated) may receive a request to verify attribute 212 of user 210. User 210 may provide identifying information 402 as part of the request. Specifically, user 210 may have provided their full legal name and date of birth as identifying information 402, although user 210 may, in other embodiments, provide various other forms of uniquely identifying information. In some examples, identifying information 402 may include attribute 212.

Determination module 106 may use identifying information 402 in order to locate trusted records associated with that identifying information. As shown in FIG. 4, determination module 106 may search a database of trusted records for trusted records that match identifying information 402. Three such records, trusted records 214, 410, and 414, may contain identifying information (identifying information 404, 412, and 416, respectively) that matches identifying information 402. Determination module 106 may determine that these trusted records are each associated with a vehicle. Specifically, trusted records 214, 401, and 414 may be associated with vehicles 208, 406, and 408, respectively. However, determination module 106 may determine that trusted record 414 does not contain information that could be used to verify attribute 212, and may thus disqualify vehicle 408 from being selected for use by other elements of modules 102. Determination module 106 may determine that trusted records 214 and 410 do contain information that could be used to verify attribute 212, and may thus prompt user 210 to select either vehicle 208 or vehicle 406 for an access-validation check.

Returning to FIG. 3 at step 308, one or more of the systems described herein may confirm that the user has physical access to the vehicle by performing an access-validation check. For example, confirmation module 108 may, as part of server 206 in FIG. 2, confirm that user 210 has physical access to vehicle 208 by performing access-validation check 216.

Confirmation module 108 may perform access validation check 216 in a variety of ways. In one embodiment, confirmation module 108 may instruct the user to drive the vehicle to a verification-checkpoint location. Staff and/or automated hardware at the verification-checkpoint location may perform a variety of tasks, such as scanning the license plate of the vehicle, capturing a photograph of the user and comparing the photograph to a previously captured image of the user, capturing transponder information from a transponder attached to the vehicle, combinations of one or more of the same, or by capturing any other suitable information that could be used to conclusively determine that the vehicle was present at the verification-checkpoint location.

In some embodiments, confirmation module 108 may ask the user to prove that they have physical access to the vehicle by asking the user a knowledge-based authentication question. The correct response to the knowledge-based authentication may require information that is only obtainable through direct access to the vehicle, such as obtaining an odometer reading, describing recent locations to which the vehicle was driven, etc. Confirmation module 108 may generate such questions based on data received from vehicle 208's onboard computer.

In some embodiments, confirmation module 108 may transmit a confirmation code to the vehicle. In such embodiments, the user may obtain the authorization code from the vehicle and use the authorization code to respond to the access-validation check. As a specific example, vehicle 208 may receive the authorization code from one or more vehicle communications technologies, such as GM ON-STAR or BMW DRIVER ASSIST. Furthermore, the vehicle may use an onboard network (e.g., a built-in BLUETOOTH network) to transmit the authorization code to a mobile device paired to the onboard network. The user may then receive the authorization code from the mobile device and respond correctly to the authentication question.

Figure 5:
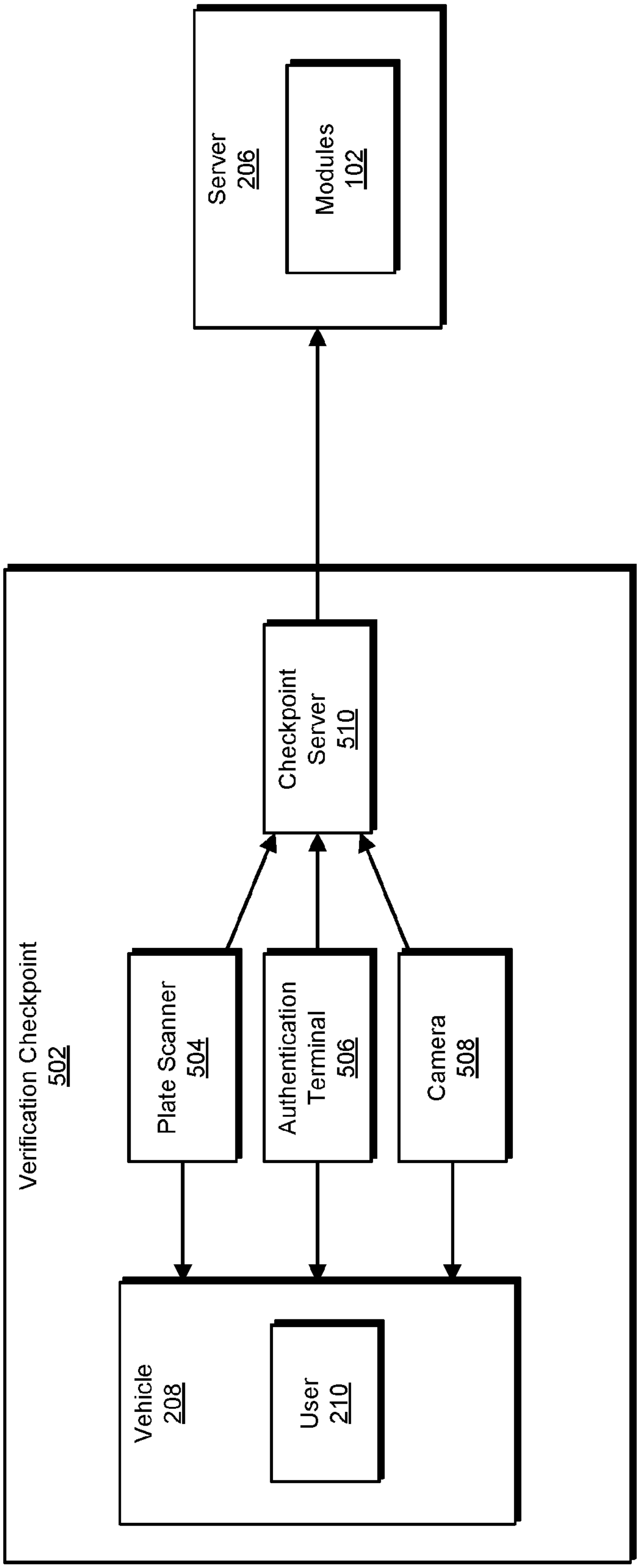
FIG. 5 is a block diagram of an exemplary verification checkpoint for verifying user attributes.

An illustration of an exemplary verification checkpoint is provided in connection with FIG. 5. In this example, confirmation module 108 has prompted user 210 to drive vehicle 208 to a verification checkpoint 502 in order to confirm that they have physical access to vehicle 208. Once user 210 has driven vehicle 208 to verification checkpoint 502, systems present at verification checkpoint 502 may confirm that vehicle 208 is present and/or confirm the identity of user 210. In the example of FIG. 5, a plate scanner 504 reads the license plate of vehicle 208. An authentication terminal 506 presents user 210 with a knowledge-based authentication question, such as prompting user 210 to input a verification code provided by confirmation module 108 as part of prompting user 210 to drive vehicle 208 to verification checkpoint 502. Finally, a camera 508 may photograph user 210 to further verify user 210's identity. In the event that user 210 is attempting to verify a fraudulent attribute or otherwise exploit systems and methods described herein, images captured by camera 508 may aid law enforcement in identifying user 210. The various elements present at verification checkpoint 502 may communicate data to a checkpoint server 510 that collects the data.

Although not illustrated in FIG. 5, all or a portion of confirmation module 108 may execute on checkpoint server 510 and/or server 206. In some examples, checkpoint server 510 may transmit all or a portion of the data collected by plate scanner 504, authentication terminal 506, and/or camera 508 to server 206. Additionally or alternatively, checkpoint server 510 may return an "access confirmed" signal to a component of confirmation module 108 executing on server 206 rather than transmitting the data collected at verification checkpoint 502 to server 206.

At step 310 in FIG. 3, one or more of the systems described herein may use the trusted record to verify the attribute of the user. For example, verification module 110 may, as part of server 206 in FIG. 2 and in response to confirming that user 210 has physical access to vehicle 208, use trusted record to verify attribute 212 of user 210.

Verification module 110 may verify attribute 212 of user 210 in a variety of ways. For example, verification module 110 may compare information within the above-identified trusted record to personal information provided by the user. If the personal information matches the information in the trusted record, verification module 110 may verify the personal information as authentic based on the user having proven that they have physical access to the vehicle that is associated with the trusted record.

As a more detailed example, the trusted record may include a vehicle ownership record. The vehicle ownership record may be managed by a government-operated database of motor vehicles, such as a DEPARTMENT OF MOTOR VEHICLES. Verification module 110 may access the vehicle ownership record and compare information within the vehicle ownership record to personal information provided by the user. If the information contained in the vehicle ownership record matches the information provided by the user, verification module 110 may verify that the personal information provided by the user.

As described in greater detail above, systems and methods described herein may provide conclusive verification of user attributes by identifying a trusted record that contains information that can be used to verify the attribute. The trusted record may also be associated with a vehicle, and systems and methods described herein may establish a link between the user and the trusted record by confirming that the user has physical access to the vehicle. Once this connection has been established, systems and methods described herein may use the trusted record to verify attributes of the user.

Figure 6:
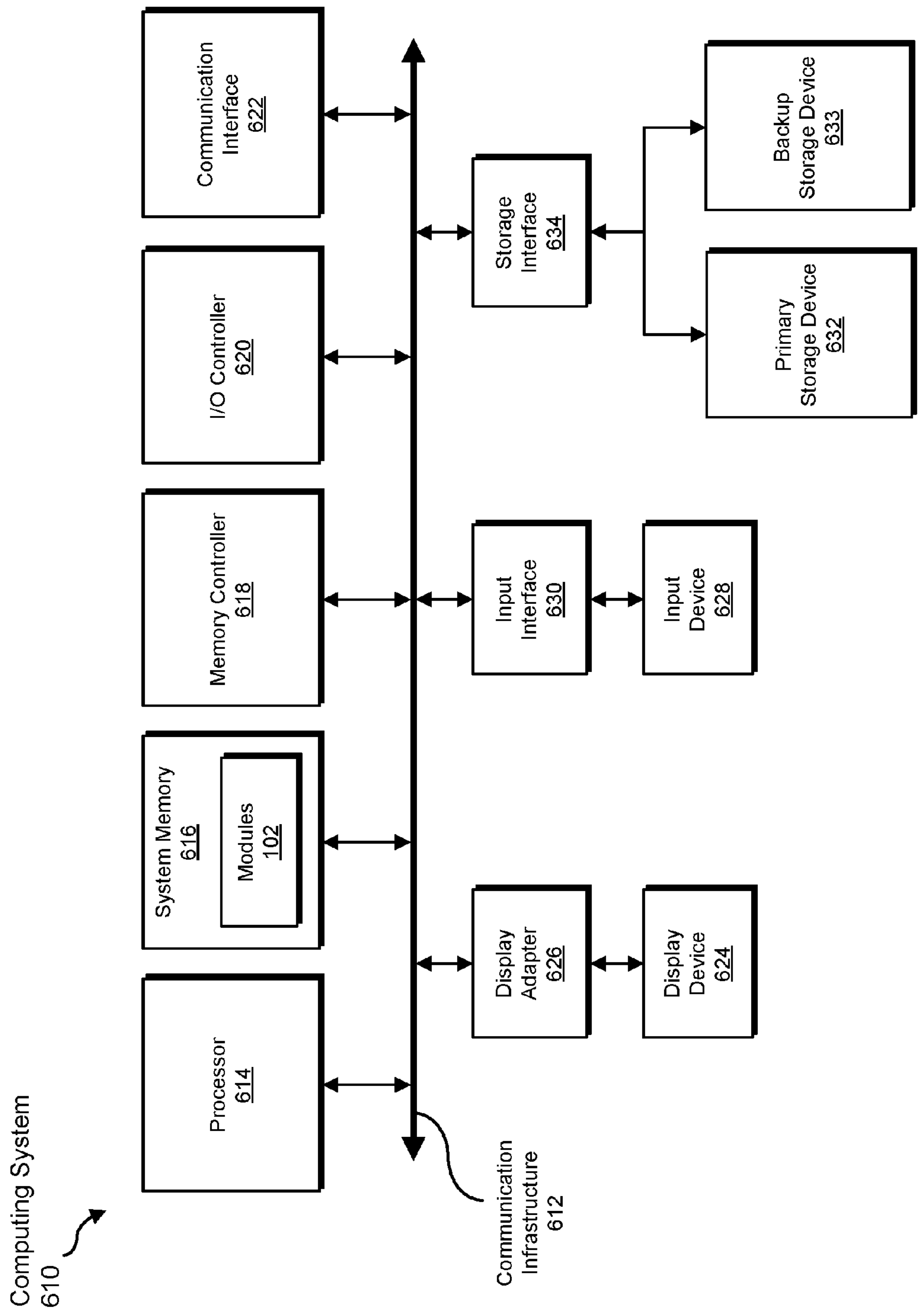
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
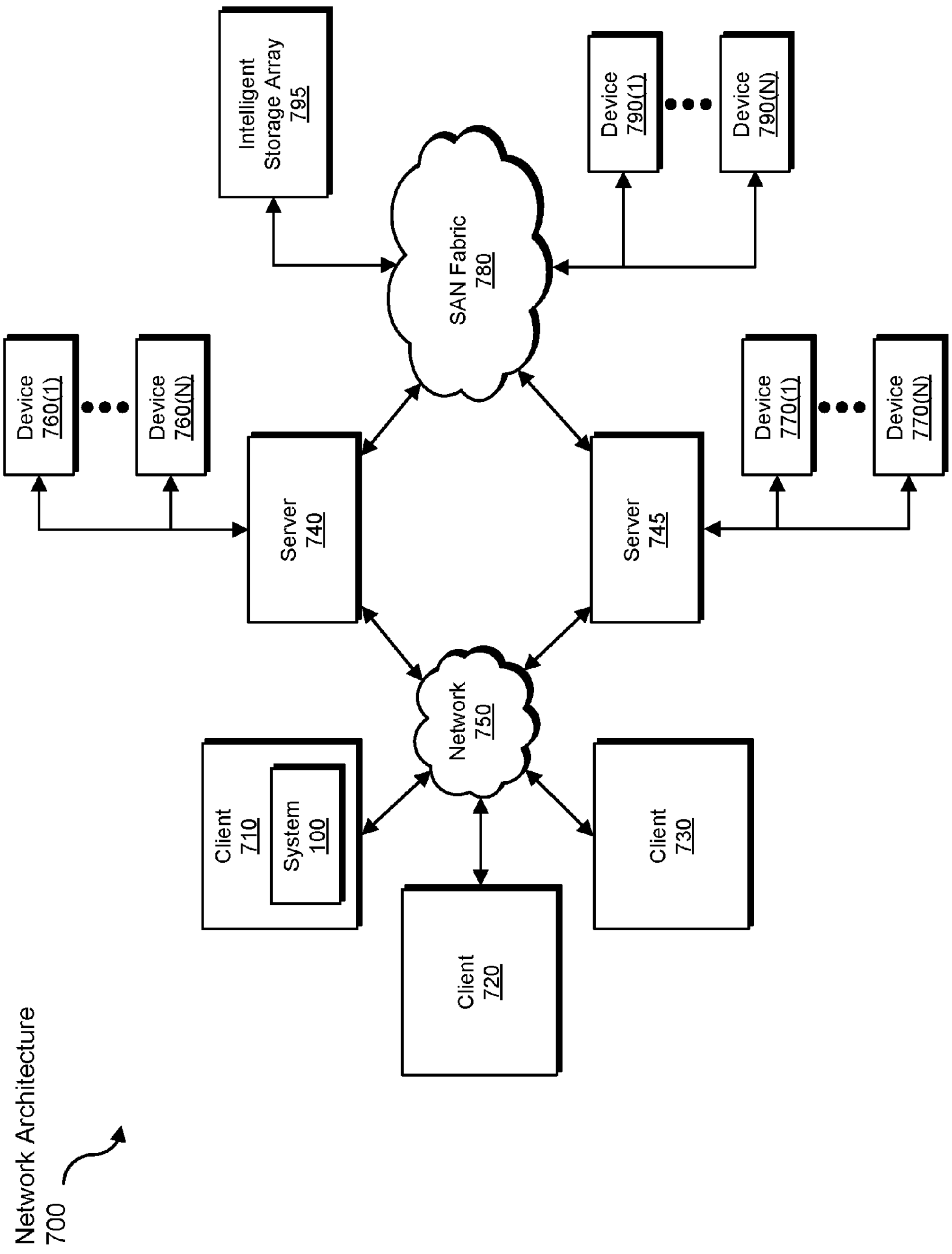
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for verifying user attributes.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive an attribute verification request, identify an attribute listed in the attribute request, retrieve a trusted record that can be used to verify the attribute, identify a vehicle associated with the trusted record, transform the above information into an access-validation check, use a result of the access validation check to confirm that the user associated with the attribute verification request has access to the vehicle, use a result of the confirmation to establish a connection between the user and the trusted record, and use the established connection to verify the attribute of the user. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for verifying user attributes, at least a portion of the method being performed by a computing device comprising at least one processor, the method comprising:

receiving a request to verify an attribute of a user who claims to be a particular person;

determining that the attribute can be verified using a trusted record that is associated with the particular person and is maintained by an entity that verified the identity of the particular person prior to creating the trusted record;

determining that the trusted record is associated with a vehicle to which the particular person has access rights;

confirming that the user is able to physically access the vehicle by performing an access-validation check that demonstrates the user's ability to physically access the vehicle; and in response to confirming that the user has physical access to the vehicle, validating the user as the particular person and using the trusted record to verify the attribute of the user.

2. The method of claim 1, wherein performing the access-validation check comprises instructing the user to drive the vehicle to a verification checkpoint location.

3. The method of claim 2, wherein the verification checkpoint location performs at least one of:

scanning the license plate of the vehicle;

capturing a photograph of the user and comparing the photograph to a previously captured image of the user; and capturing transponder information from a transponder attached to the vehicle.

4. The method of claim 1, wherein:

performing the access-validation check comprises asking the user a knowledge-based authentication question; and the correct response to the knowledge-based authentication requires information that is only obtainable through direct access to the vehicle.

5. The method of claim 1, wherein performing the access-validation check comprises:

transmitting an authorization code to the vehicle; and obtaining the authorization code from the vehicle and using the authorization code to respond to the access-validation check.

6. The method of claim 5, wherein transmitting the authorization code to the vehicle comprises:

providing the authorization code to an onboard network that is part of the vehicle; and transmitting, by the onboard network, the authorization code to a mobile device paired to the onboard network.

7. The method of claim 1, wherein:

verifying the attribute of the user comprises accessing a vehicle ownership record about the vehicle that is managed by a government-operated database of motor vehicles; and the trusted record comprises the vehicle ownership record.

8. The method of claim 7, wherein using the trusted record to verify the attribute of the user comprises comparing information within the vehicle ownership record to personal information provided by the user.

9. The method of claim 1, wherein the attribute of the user comprises at least one of:

the user's physical address;

the user's age;

the user's date of birth;

the user's social security number;

a financial security rating associated with the user;

the user's driving record; and the user's employment status.

10. The method of claim 1, wherein the access rights comprise at least one of:

the vehicle being a company vehicle that is assigned to be driven by the user;

the user's name appearing on a vehicle registration that is linked to the vehicle; and the user's name appearing on an automotive insurance policy that is linked to the vehicle.

11. A system for verifying user attributes, the system comprising:

a receiving module, stored in memory, that receives a request to verify an attribute of a user who claims to be a particular person;

a determination module, stored in memory, that:

determines that the attribute can be verified using a trusted record that is associated with the particular person and is maintained by an entity that verified the identity of the particular person prior to creating the trusted record; and determines that the trusted record is associated with a vehicle to which the particular person has access rights;

a confirmation module, stored in memory, that confirms the user's ability to physically access the vehicle by performing an access-validation check that demonstrates the user's ability to physically access the vehicle;

a verification module, stored in memory, that, in response to confirming that the user has physical access to the vehicle, validates the user as the particular person and uses the trusted record to verify the attribute of the user; and at least one physical processor configured to execute the receiving module, the determination module, the confirmation module, and the verification module.

12. The system of claim 11, wherein the confirmation module performs the access-validation check by instructing the user to drive the vehicle to a verification checkpoint location.

13. The system of claim 12, wherein the verification checkpoint location performs at least one of:

scanning the license plate of the vehicle;

capturing a photograph of the user and comparing the photograph to a previously captured image of the user; and capturing transponder information from a transponder attached to the vehicle.

14. The system of claim 11, wherein:

the confirmation module performs the access-validation check by asking the user a knowledge-based authentication question; and the correct response to the knowledge-based authentication requires information that is only obtainable through direct access to the vehicle.

15. The system of claim 11, wherein the confirmation module performs the access-validation check by:

transmitting an authorization code to the vehicle; and obtaining the authorization code from the vehicle and using the authorization code to respond to the access-validation check.

16. The system of claim 15, wherein the confirmation module transmits the authorization code to the vehicle by:

providing the authorization code to an onboard network that is part of the vehicle; and transmitting, by the onboard network, the authorization code to a mobile device paired to the onboard network.

17. The system of claim 11, wherein:

the verification module verifies the attribute of the user by accessing a vehicle ownership record about the vehicle that is managed by a government-operated database of motor vehicles; and the trusted record comprises the vehicle ownership record.

18. The system of claim 17, wherein the verification module uses the trusted record to verify the attribute of the user by comparing information within the vehicle ownership record to personal information provided by the user.

19. The system of claim 11, wherein the attribute of the user comprises at least one of:

the user's physical address;

the user's age;

the user's date of birth;

the user's social security number;

a financial security rating associated with the user;
the user's driving record; and
the user's employment status.

20. A non-transitory computer-readable medium comprising one or more computer-readable instructions that, when executed by at least one processor of a computing device, cause the computing device to:

receive a request to verify an attribute of a user who claims to be a particular person;

determine that the attribute can be verified using a trusted record that is associated with the particular person and is maintained by an entity that verified the identity of the particular person prior to creating the trusted record;

determine that the trusted record is associated with a vehicle to which the particular person has access rights;

confirm that the user is able to physically access the vehicle by performing an access-validation check that demonstrates the user's ability to physically access the vehicle; and in response to confirming that the user has physical access to the vehicle, validate the user as the particular person and use the trusted record to verify the attribute of the user.

* * * * *